(12) United States Patent
Willett

(10) Patent No.: US 8,376,727 B2
(45) Date of Patent: Feb. 19, 2013

(54) MOULDER SAFETY GUARD

(75) Inventor: Paul Eaton Willett, Whiteside (AU)

(73) Assignee: Moffat Pty Limited, Mulgrave (AU)

( * ) Notice: Subject to any disclaimer, the term of this patent is extended or adjusted under 35 U.S.C. 154(b) by 345 days.

(21) Appl. No.: 12/711,890

(22) Filed: Feb. 24, 2010

(65) Prior Publication Data

US 2010/0215789 A1    Aug. 26, 2010

(30) Foreign Application Priority Data

Feb. 26, 2009 (AU) ................................ 2009900858

(51) Int. Cl.
*A21C 3/02* (2006.01)

(52) U.S. Cl. ........ 425/136; 425/151; 425/152; 425/213; 425/223

(58) Field of Classification Search .................. 425/136, 425/151, 152, 193, 213, 223, 363, 324.1, 425/335

See application file for complete search history.

(56) References Cited

U.S. PATENT DOCUMENTS

| | | | | | |
|---|---|---|---|---|---|
| 4,124,341 | A | * | 11/1978 | Locker | 425/136 |
| 4,255,106 | A | * | 3/1981 | Anetsberger et al. | 425/152 |
| 4,648,822 | A | * | 3/1987 | Vandervoort et al. | 425/135 |
| 4,966,071 | A | * | 10/1990 | Willett | 99/450.1 |
| 4,971,545 | A | * | 11/1990 | Willett | 425/321 |
| 4,976,600 | A | * | 12/1990 | Willett | 425/151 |
| 5,225,209 | A | * | 7/1993 | Hayashi | 425/145 |
| 5,783,222 | A | * | 7/1998 | Voyatzakis et al. | 425/151 |
| 5,800,844 | A | * | 9/1998 | Raio et al. | 425/150 |
| 7,987,757 | B2 | * | 8/2011 | Willett | 83/419 |
| 2009/0078099 | A1 | * | 3/2009 | Willett | 83/165 |

* cited by examiner

*Primary Examiner* — Joseph Del Sole
*Assistant Examiner* — Seyed Masoud Malekzadeh
(74) *Attorney, Agent, or Firm* — Christensen O'Connor Johnson Kindness PLLC

(57) ABSTRACT

A dough molder including a housing for at least one pair of rollers 1 having an access opening 5 to the at least one pair of rollers 1. The access opening 5 is provided with a guard arrangement 7 on which the operators arm rests during operation of the rollers. The dough molder further includes a detector 6 having means to interrupt operation of the molding rollers when the operator's hand is detected by light beams 18, 19 as extending beyond predetermined limits through the access opening 5 and moving to a position where the rollers 1 can be reached by the operator.

8 Claims, 7 Drawing Sheets

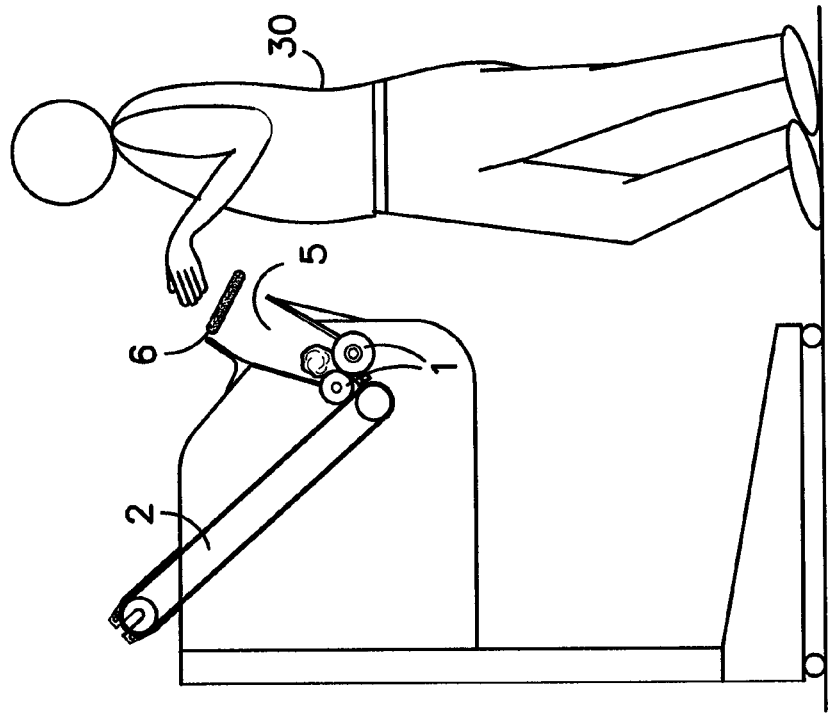
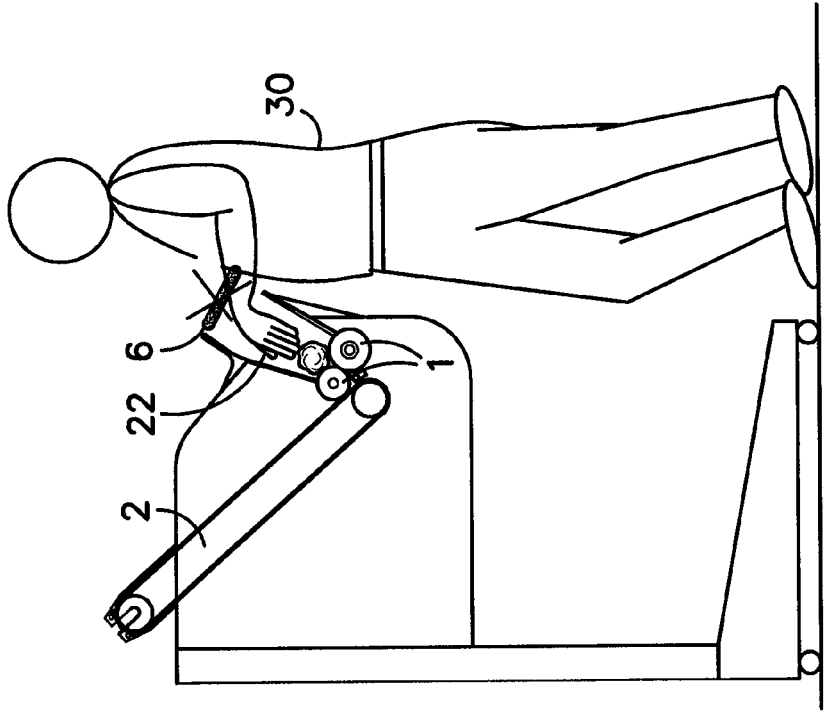

MOULDER SAFETY GUARD

This invention relates to a guard arrangement for dough moulding machines.

BACKGROUND OF THE INVENTION

With the recent introduction of a bakery set up in commercial shopping outlets or bakery departments in supermarkets, a premium is placed on working space and flexibility of product production. As many of the products are produced in relatively small runs, the economics of a bakery of this type is generally improved if as many types of product can be produced from as few dough types as possible and the number of pieces of equipment used to produce the different products can be minimised.

Dough moulding machines are conventionally used to receive a piece of pre-weighted dough and mould it to a desired shape for a specific bakery product before it is then proved and baked.

Dough moulding machines have several important common components, and these work together to sheet out, curl up and pressure mould a dough piece to a required shape. The sheeting rollers on most moulding machines are typically one or two sets of sheeting rollers that are usually adjustable so that the roller gap is able to be controlled. Small dough pieces [for example, about 80 grams] are sheeted through a gap typically 3 to 4 mm, while larger pieces of 700 grams would typically be sheeted through a wider gap of 8 or 10 mm.

The dough piece is usually pre-shaped into a ball, and has had a period of rest time to permit fermentation to occur prior to moulding, and this also adds bulk to the dough ball. The dough piece can otherwise be cube shaped, as from a divider called a D-20, or it can be oblong in a tubular shape to permit baguettes (sticks) to be made without additional hand work.

All of the above mentioned shapes are best moulded by allowing the worker to hold one end of the dough piece, as it is placed onto the sheeting rollers and passed through the sheeting roller gap as a long narrowish piece. Large loaves such as Vienna loaves, and tinned loaves greatly benefit in their shape, by this process. Simply throwing the ball of dough into the rollers results in variations in dough shape and quality, and the roller gap often needs to be wider in this case. Therefore depending on the type of product being produced, in many cases the dough needs to be placed onto the sheeting rollers with the operator holding the end of the dough as it passes through the sheeting rollers. This inevitably leads to the operator's fingers being in close proximity to the sheeting rollers creating an occupational hazard. To reduce the occupational hazard, guard systems have been considered to limit access of the operator's fingers to the sheeting rollers but these guard systems have invariably negatively impacted the ease of operation and modes of operation of dough moulding machines. In fact, guarding systems that simply place the ball of dough into the roller gap without the ability to hold the end of the dough as it passes through the rollers are generally disliked by operators.

It is the intention of the present invention to permit clear and open access to the sheeting rollers of a moulder, and permit the dough piece to be hand fed through the roller gap, in a safe and reliable manner.

SUMMARY OF THE INVENTION

In one aspect of the invention there is provided a dough moulder including
 a housing having rollers and an access opening through which an operator deposits dough for the rollers;
 a guard adjacent the access opening;
 a space above the guard and access opening in which the operators arm moves
 a detector positioned above the access opening and defining a detector space within the space above the guard and access opening, the detector being operable to interrupt the operation of the rollers when the operator's arm is detected in the detector space.

The detector is positioned relative to the access opening to detect straightening of an operator's wrist to reach toward the rollers beyond predetermined limits. Advantageously the operation may be interrupted by stopping the rollers. Preferably the guard is positioned relative to the access opening a distance from the rollers, the distance being sufficient so that the operators hand cannot touch the rollers when the operators wrist is in contact with the guard. Hence the guard acts as a wrist positioner. The detector may include at least one sensor which is positioned to permit the hand of the operator to enter the access opening without deactivating the rollers for placing material onto the rollers. The distance is preferably about 225 mm, say between 200 mm and 250 mm.

In preferred forms of the invention, the at least one sensor includes one or more beam emitters and receivers forming a light curtain in the detector space which extends across the access opening. The emitters and receivers are preferably positioned on holders in the form of arms which extend on either side of the access opening. The emitters and receivers may be on respective holders. Alternatively, the emitters and receivers may be positioned on a common holder and cooperate with a reflector on the other holder. The light curtain is preferably at least approximately perpendicular to the access opening.

In another aspect of the invention there is provided a dough moulder comprising
 rollers having an operative condition and an inoperative condition, and an access path for an operator to present dough to the rollers, and
 a wrist positioner in proximity to the access path for locating the wrist of an operator at a distance from the roller's where the operator's hand cannot contact the rollers but can access the access path, and a detector to render the rollers inoperative when it detects the wrist extending beyond the wrist positioner.

The path preferably has a fixed shape, and most preferably is configured for ready access to the rollers for retrieving dough pieces when in the inoperative condition.

The wrist positioner is preferably a solid guard for underlying the operator's wrist. Advantageously the detector is arranged to deactivate the rollers in response to straightening of the operator's wrist to reach toward the rollers. The detector may include an optical sensor(s), which may form a light curtain.

There is disclosed a dough moulder including a housing for at least one pair of rollers having an access opening to the at least one pair of rollers, the access opening being provided with a guard arrangement to limit access, the guard arrangement including a detector having means to interrupt operation of the moulding rollers when the operator's hand is detected as extending beyond predetermined limits through the access opening.

In a preferred form of the invention, the detector stops operation of the at least one pair of rollers once the operator's hand is detected as extending beyond predetermined limits. It is preferable that once the operator's hand is detected as no longer extending beyond the predetermined limits, then the pair of moulding rollers are able to reactivate. The reactivation may be a manual restarting operation or the rollers may restart automatically once the detector detects the operator's hands are within the predetermined limits or after a period of time after the operator's hands are within predetermined limits.

The predetermined limits of hand extension are preferably defined by an access guard and a plurality of sensors positioned in proximity to the access opening to permit the hand of the operator to enter the access opening without deactivating the rollers, thereby permitting material to be placed onto the rollers. This allows the operator's hands to be located on the guard and be in close proximity to the rollers for controlled presentation of the dough to the rollers without actually being able to contact the rollers. However, once the operator's hand moves to a position or is positioned to be able to extend to the proximity of or contact the rollers, this positioning is detected by the sensors causing the rollers to be deactivated.

The sensors may include a plurality of beam emitters and receivers forming a light curtain which extend across the access opening. The sensors are preferably spaced from the access opening a sufficient distance to allow an operator's arm to be able to pass comfortably between the access opening and the sensors. In this position the operator is able to place his or her hand and any material in their hand into the access opening.

In preferred forms of the invention, when the operator's arm rest on the physical guard with their wrist on or in proximity to the access opening, the operator's fingers are not able to reach the rollers. In order for the fingers to reach the rollers, the fingers must be extended and the wrist partially straightened so that the angle between the hand and lower forearm is less acute. This can be done by raising the lower forearm relative to the wrist. This straightening of the arm and hand causes the operator's arm to interrupt a beam extending across the access opening from the emitters to the receivers. Interruption of the beam or beams triggers a switch which deactivates the rollers.

As mentioned above, the sensors may be a plurality of emitters and sensors. These emitters are preferably positioned by a holder and produce a beam which extends from the holder for housing the emitters and receivers. The holders may be in the form of arms which extend on either side of the access opening and would generally extend towards the operator. In this way straightening of the operator's arm brings the arm into the field between the detector arms. The emitters may be on one side of the access opening and receivers on the other with a light beam extending from the emitters to the receivers. When the beam is interrupted by the operator's arm a switch deactivates the rollers. Alternatively the emitters and receivers may be located on the same detector arm and a reflector positioned on the opposite detector arm positioned to reflect the beam from the emitter to the receiver. The emitters, receivers and reflectors are preferably positioned relative to one another so that there is insufficient space between adjacent beams for the arm of an operator to be positioned without breaking one or other of the beams. Hence the maximum spacing between adjacent beams produced by the emitter transmitting to the detector with or without an intermediate reflector is the average width of the operator's hand or arm.

It should be noted that other guarding devices usually consist of barriers or paddle wheels that only allow roundish dough balls to be processed, and the restricted access this causes to the roller gap, means that a dough piece that fails to pass through the roller gap, is difficult to retrieve, and the worker has little control of how the typically rough bottom of the dough piece, enters the roller gap, this has effects on quality and appearance of the finished loaf. Preferred forms of the invention solve this problem as the operator can retrieve the piece, and control how the dough piece enters the roller gap.

BRIEF DESCRIPTION OF THE DRAWINGS

The features, of the present invention will now be described in the following description of the preferred embodiment and accompanying drawings in which FIG. 4A is the operation of the dough moulder which causes the moulding rollers to deactivate, FIG. 4B is a side view of an action by the operator which will allow the moulding rollers to reactivate.

DETAILED DESCRIPTION OF THE EMBODIMENTS

Figure 1:
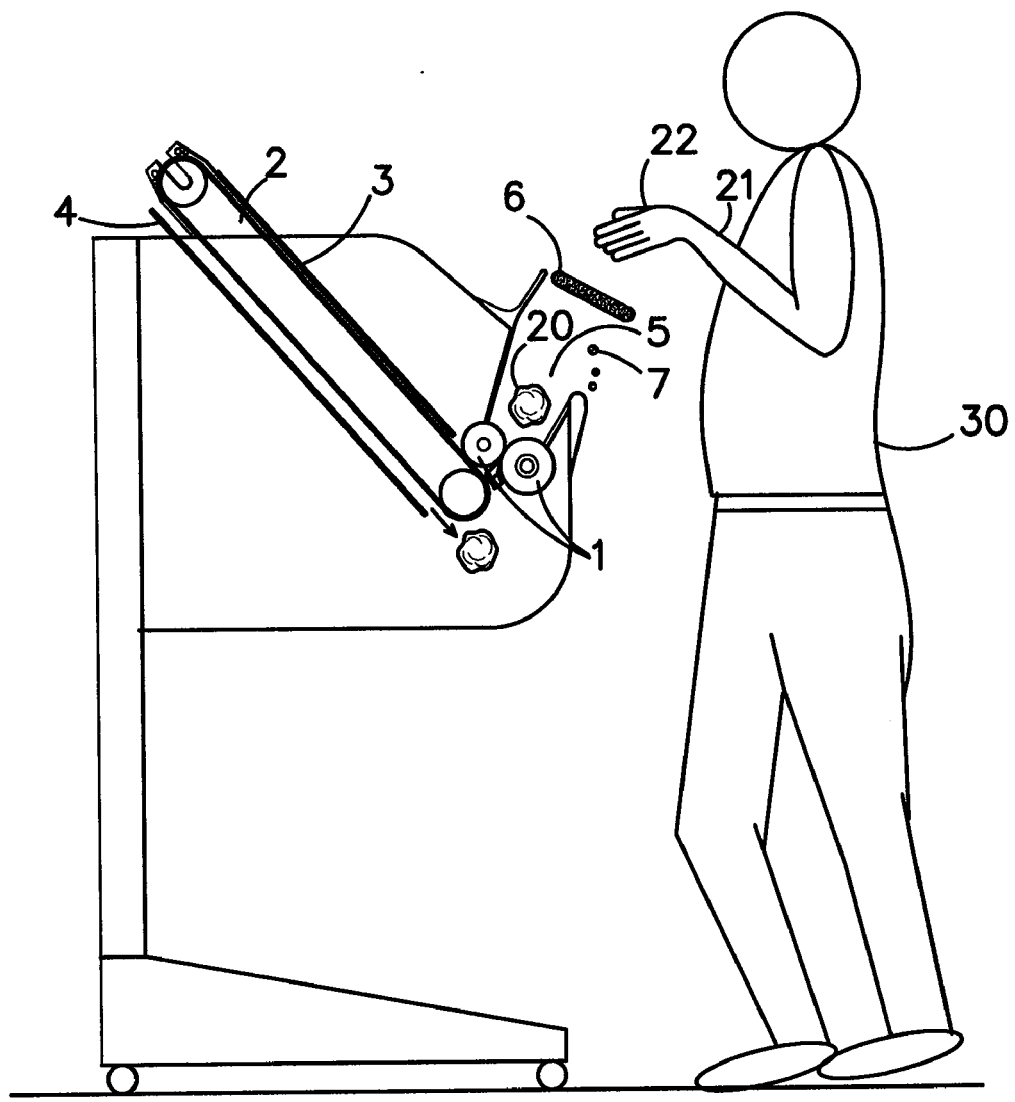
FIG. 1 is a side view of a dough moulder with a guard arrangement in accordance with the invention.

Referring to FIG. 1, a moulder in accordance with the invention is shown in side view. The moulder according to the invention includes a housing having rollers, an access opening through which an operator deposits dough for the rollers and a guard 7 is adjacent the access opening. A detector is positioned above the access opening 5 and defines a detector space within the space above the guard 7 and access opening 5 in part of the space in which the operators arm moves. The detector is operable to interrupt the operation of the rollers when the operator's arm is detected in the detector space.

The moulder includes sheeting rollers 1, for reducing the dough to a substantially constant thickness. Once sheeted out the dough is transported by conveyor belt 2 under a curling chain 3 where the dough is rolled into a cylindrical shape. The dough then passes to the lower section of the conveyor belt 2 where a pressure board 4 rolls and shapes the dough to a cylinder of the required diameter. The pressure board 4 may be provided with stationary cutting blades to slice the dough into appropriate dough sizes.

The preferred form of the detector is a light curtain or series of photo cells and optionally reflectors which extend across the access opening 5 of the moulder. This embodiment of the invention shows a holder 11 which houses the photo cells of either or both emitters and detectors which in effect produces a light curtain that guards a portion of the mouth of the machine. The invention may also provide an access guard 7, which is fixed in position relative to the access opening and provides a fixed point of reference for the operation relative to the light curtain.

The light curtain or detector may include any form of light sensitive switching or proximity type switching, laser beam emitters and detectors, movement sensitive devices or any other device commonly known in the art which produces a non-physical barrier where the positioning of an operator's arm between the detectors can be identified and an appropriate response initiated. The rollers will generally be provided with a shut off switch will be activated to turn off the rollers when the detector detects an object breaking one or more of the emitter beam or beams.

The holder 11 which determines the position of the light curtain is placed relative to the access guard to enable the operator to keep their arm under the light curtain and feed the dough into the sheeting rollers 1. The access can only be enabled by the operator bending the arm 21 at the wrist so that the dough can be retained by the fingers 22 and fed into the rollers 1. However the access guard 7 is positioned a sufficient distance from the rollers 1 so that when resting against the access guard 7, an operator's fingers 22 cannot reach the rollers. The only way the operator's fingers can be extended to reach the rollers is by straightening their arm and interrupting the light curtain.

In the operation of the invention shown in FIG. 1, a bread roll size dough piece 20 is dropped into the access opening 5 of the moulder past the light curtain 6, and as the dough breaks the beam, the machines motor [not shown], is turned off for a short time, but restarts once the beam is re-established.

Figure 2:
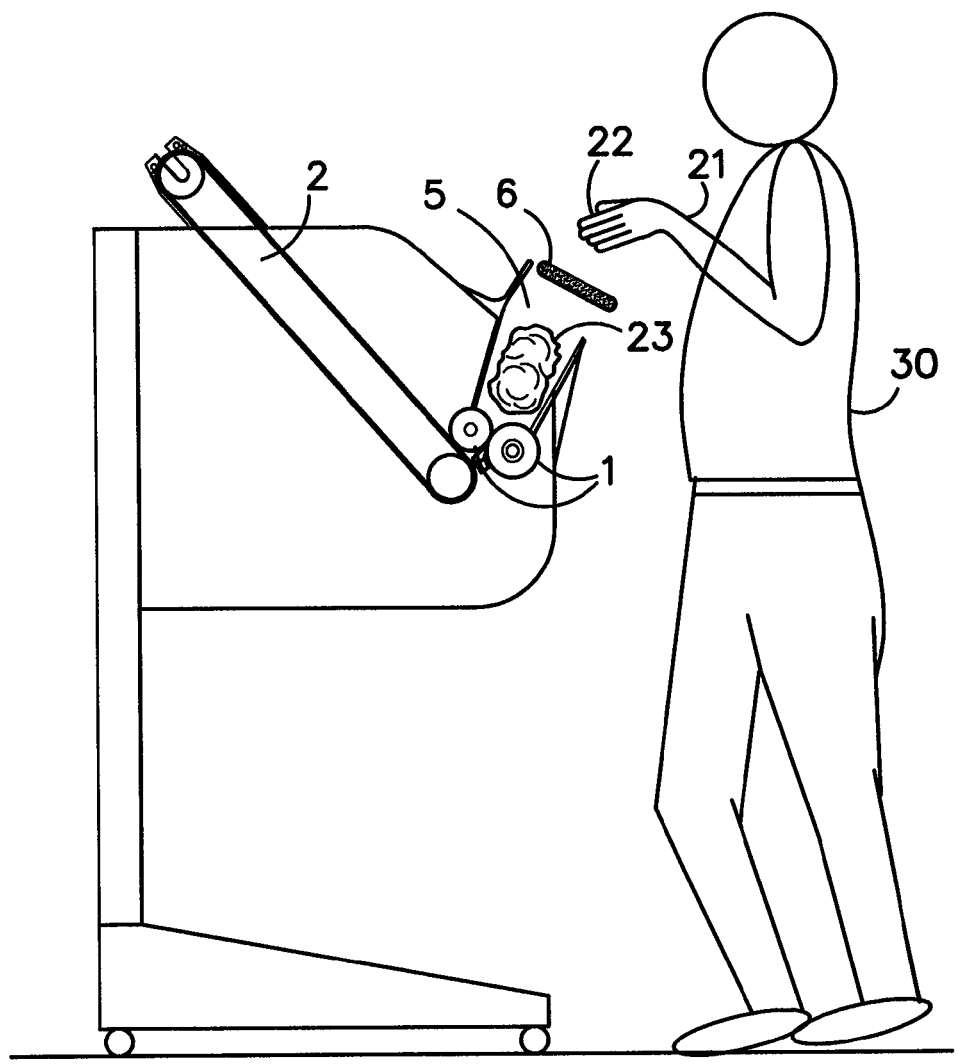
FIG. 2 is a side view of the embodiment of the invention with large pieces of material being moulded.

In the operation of the invention shown in FIG. 2, the process is similar for larger loaves if the operator wishes to simply drop the round dough ball 23 into the gap between the rollers, instead of holding the dough 23 as a long portion and feeding it through from one end.

Figure 3B:
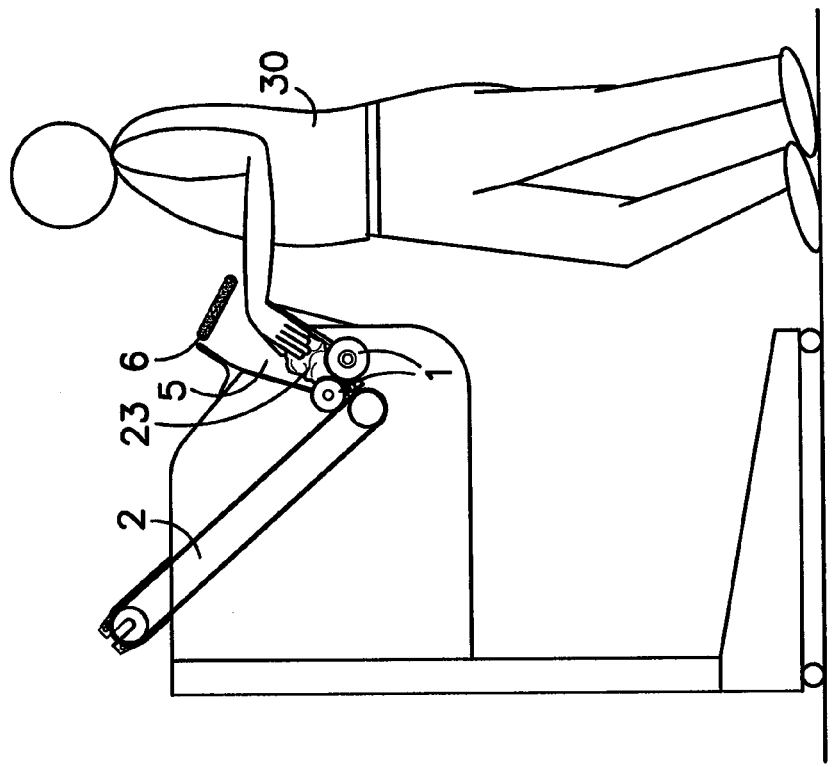
FIG. 3B is operation of the moulding roller with guard arrangement where the moulding rollers are not deactivated.
Figure 3A:
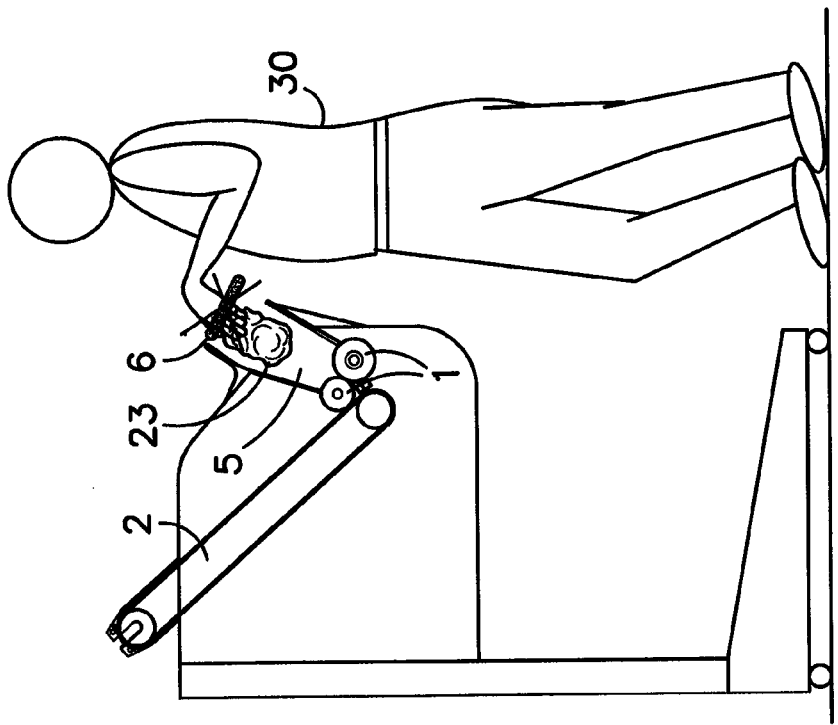
FIG. 3A is operation of a dough moulder which causes deactivation of the moulding rollers.
Figure 5A:
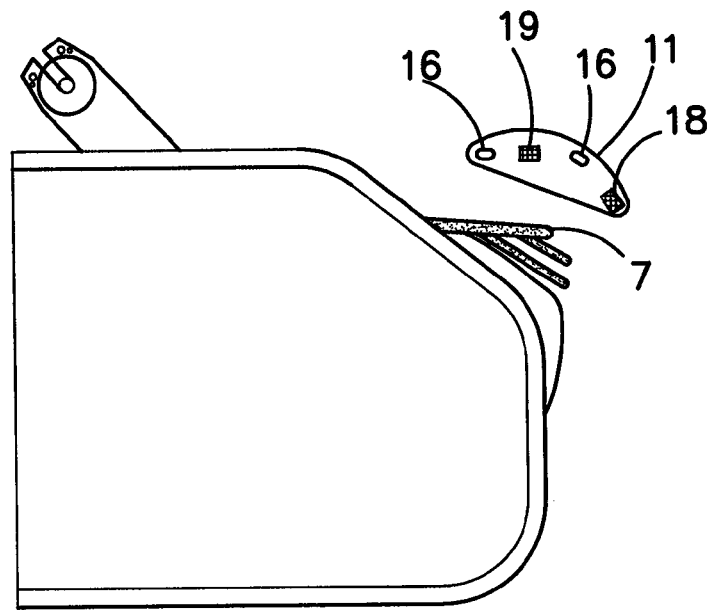
FIG. 5A is a side view of a guard arrangement according to an embodiment of the invention.
Figure 5B:
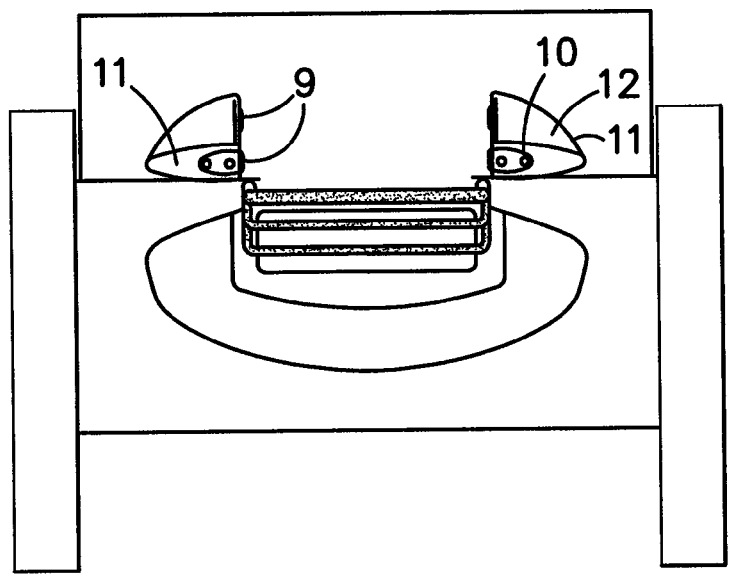
FIG. 5B is a front view of the guard arrangement of FIG. 5A.
Figure 6:
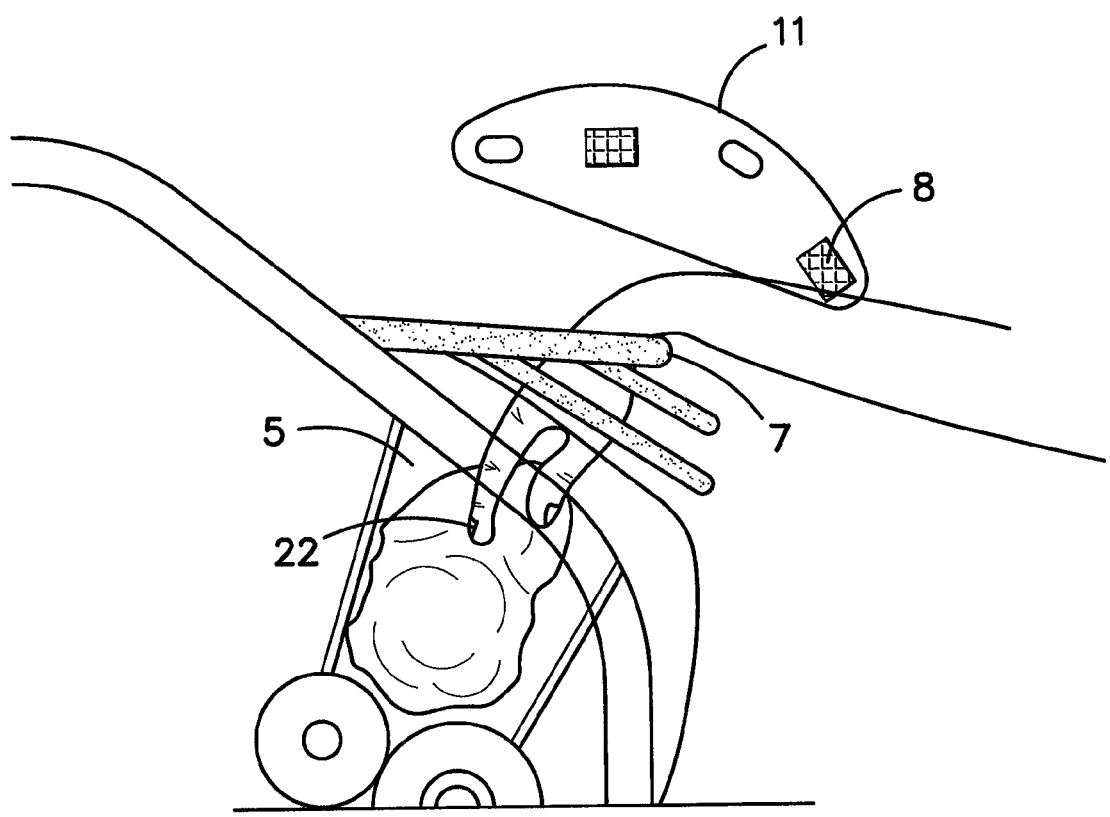
FIG. 6 is an enlarged view of the guard arrangement of FIG. 5A, illustrating the relationship between the guard rest and the operator's hand and arm.
Figure 7:
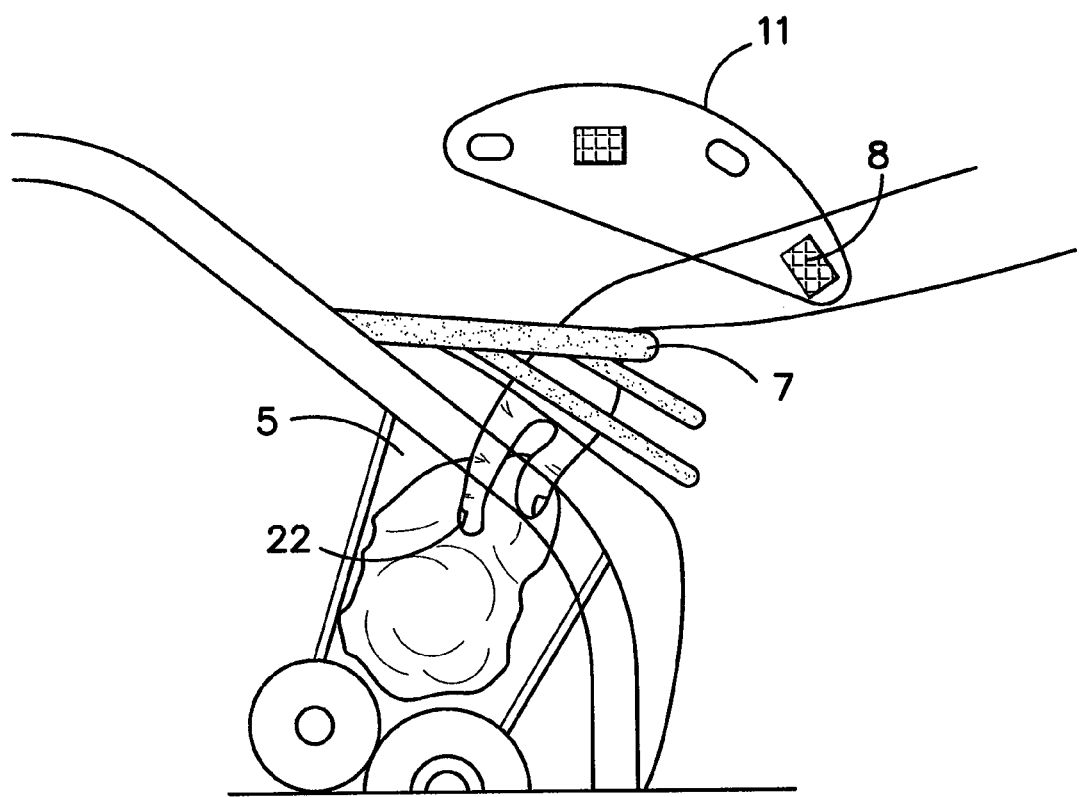
FIG. 7 is an exploded view of the guard arrangement of FIG. 5A showing a straightening of the operator's arm causing the moulding rollers to deactivate.

FIGS. 3(A) and 3(B), illustrates the areas of uniqueness of this invention, in that the design of the light curtain and the mouth guard that allows the machine to operate safely while allowing entry of fingers into the machine's mouth. In FIG. 3(A), the operator has added the large dough piece 23 through the light curtain causing the sheeting rollers 1 to be deactivated and stopped. Once the operator's hand has been removed and inserted under the light curtain, the operator is still able to grasp and hold the end of the dough (as shown in FIG. 3(B) but cannot straighten their arm sufficiently for fingers 22 to contact the rollers 1. FIGS. 5(A) and 5(B), shows the side and end views respectively of the machine and the position of an access guard bar 7 and the outer photo emitter cell 18.

Where it is preferable to place an elongated dough piece into the roller gap, this is permitted by the present invention. The operator 30 picks up the dough piece at one end, allowing it to stretch slightly as it is lifted to the moulding machines access opening 5. The workers wrist is usually bent as a natural process of lowering the dough into the access opening 5. As the dough piece passes the light beam, the machine turns off, and the worker continues to lower the dough piece 23 down into the mouth. Once the workers wrist passes the outer light beam 18, the beam is re-established and the light curtain is restored and the machine will restart immediately provided other light beams 6 are not broken. With the workers wrist in this position (FIG. 6) the distance from the workers wrist to the finger tips ensures that the finger tips 22 cannot enter the roller gap. A typical distance of 225 mm, is set as a safe working distance for this purpose, however this distance may be shorter or longer, and may be made adjustable to cope with workers non standard physical build. If the wrist and arm 21 is straightened (FIG. 7), it can be seen that the outer light beam 18, will be broken, stopping the machine immediately. It has been established that the combination of the access guard 7, the outer light beam 18, and the depth of the access channels will permit dough pieces to be lowered into the roller gap, but in a safe manner (FIG. 6), and this has little effect on the workers comfort, effort, or work speed. Allowing the operator to hold the dough piece as it runs through the roller gap is a preferred method of operation by those in the bakery trade in general, and this invention permits this in a safe and simple manner. FIG. 7 shows how the upper arm will break the outer beam 18 if the fingers are pushed further into the mouth.

FIGS. 4(A) and 4(B) show the moulding of dough for product such as French sticks (baguettes). The dough piece is made as a long cylindrical shape prior to moulding, and the long shape is placed parallel to the roller gap, with the rollers stationary. When the machine starts, the long piece is made even longer into the stick shape, with less risk of tearing the dough or damaging inside texture. Using conventional guards makes this quite impossible to do with any accuracy and many failed pieces can result.

FIGS. 5(A) and 5(B) show the side and front views of the apparatus according to an embodiment of the invention and the holder 11, 12 that house the photo electric cells 18, 19 and their reflectors 16.

In addition, there are indicators such as light emitting diodes 10 that signal the worker that one or more beams are broken. The default operation of the detector system has the beam as broken to act as a fail safe system, where a dirty reflector, photo electric cell, face, or fault in the system to render the machine inoperable. Further L.E.D. lights will therefore also signal that the mouth is clear to receive dough pieces.

Another preferred feature of the invention is a timer that is typically set from 3 to 10 seconds. In this preferred form the machine may require the pressing of the start button in the case of the mouth beams being broken for more than this preset time. This avoids the possibility of a dough piece staying in the mouth, and then the machine accidentally starting as the dough moves out of the beams. The start button preferably illuminates when the timer circuit has been tripped.

It will be understood that the invention disclosed and defined in this specification extends to all alternative combinations of two or more of the individual features mentioned or evident from the text or drawings. All of these different combinations constitute various alternative aspects of the invention.

The invention claimed is:
1. A dough moulder including:
   a housing having rollers and an access opening through which the rollers are manually accessed by an operator when the operator deposits dough onto the rollers;
   a guard fixed in position relative to the access opening, the guard providing the operator a fixed point of reference during deposition of the dough onto the rollers, the guard being adjacent the access opening;
   a space above the guard and access opening in which the operator's arm moves; and
   a detector positioned above the access opening and defining a detector space within the space above the guard and access opening, the detector including one or more pairs of beam emitters and receivers forming a light curtain which extends across the access opening, the pairs of beam emitters and receivers being positioned to permit the hand of the operator to enter the access opening without deactivating the rollers for placing material onto the rollers, and the detector being operable to interrupt the operation of the rollers when the operator's arm is detected in the detector space.

2. The dough moulder of claim 1 wherein the operation is interrupted by stopping the rollers.

3. The dough moulder of claim 1 wherein the guard is positioned relative to the access opening at a distance from the rollers, the distance being sufficient so that the operator's hand cannot touch the rollers when the operator's wrist is in contact with the guard.

4. The dough moulder of claim 1 wherein the emitters and receivers are mounted on holders which extend on either side of the access opening.

5. The dough moulder of claim 4 wherein the emitters and receivers are positioned on respective holders on either side of the access opening.

6. The dough moulder of claim 4 wherein the emitters and receivers are positioned on a first holder located on one side of the access opening and cooperate with a reflector on a second holder located on the other side of the access opening.

7. The dough moulder of claim 1 wherein the distance between the emitters and receivers is insufficient to allow the passage of an operator's arm without detection.

8. The dough moulder of claim 1 wherein the guard is a wrist positioner.

* * * * *